United States Patent
Hubbuch et al.

[15] 3,664,969
[45] May 23, 1972

[54] METHOD OF MAKING A THERMAL BED FOR GAS GENERATING

[72] Inventors: Theodore Hubbuch, Florence; James A. Murfree, Jr.; William A. Duncan, both of Huntsville; Billy J. Sandlin, Athens; Henry A. Nappier, Lacey's Spring, all of Ala.

[73] Assignee: The United States of America as represented by the Secretary of the Army

[22] Filed: Nov. 12, 1968

[21] Appl. No.: 775,998

Related U.S. Application Data

[62] Division of Ser. No. 651,324, July 5, 1967.

[52] U.S. Cl. ............................ 252/438, 252/437, 252/441, 149/36
[51] Int. Cl. ................................................ B01j 11/82
[58] Field of Search ............... 149/36, 174; 252/438, 449, 252/451, 463, 437, 441, 442

[56] References Cited

UNITED STATES PATENTS

| | | | |
|---|---|---|---|
| 2,926,144 | 2/1960 | Plescia et al. | 149/36 |
| 3,000,716 | 9/1961 | Lawrence et al. | 149/36 |
| 3,021,667 | 2/1962 | Griffin et al. | 149/36 |
| 3,081,595 | 3/1963 | Rose | 149/36 |
| 3,086,945 | 4/1963 | Cohn | 149/36 |
| 3,244,618 | 4/1966 | Diamond et al. | 252/438 |
| 3,313,739 | 4/1967 | Acker | 252/451 |
| 3,461,084 | 8/1969 | Li | 252/441 |
| 3,474,041 | 10/1969 | Kerr | 252/437 |

OTHER PUBLICATIONS

"Uses and Applications of Chemicals and Related Materials;" Thomas C. Gregory; Reinhold Publ. Corp., Copyright 1939; pp. 26 & 27; pp. 166 & 167; p. 518

Primary Examiner—Carl D. Quarforth
Assistant Examiner—Stephen J. Lechert, Jr.
Attorney—Harry M. Saragovitz, Edward J. Kelly, Herbert Berl and James T. Deaton

[57] ABSTRACT

The loading of a gas generating bed such as activated charcoal with a fluid such as dinitrogen tetroxide by exposing the bed to an atmosphere of the fluid.

5 Claims, No Drawings

METHOD OF MAKING A THERMAL BED FOR GAS GENERATING

CROSS-REFERENCE TO RELATED APPLICATION

This application is a division of applicants' copending application Ser. No. 651,324, filed July 5, 1967.

BACKGROUND OF THE INVENTION

This invention relates to gas generation and in particular to gas generation with liquid monopropellant systems.

There is considerable interest in the rocket propulsion industry in the development and use of liquid monopropellant gas generators. Although the majority of attention has been given to catalytic decomposition schemes, considerable recent interest has been shown in "one-shot" schemes of gas generation utilizing a liquid monopropellant with an initiator and inert bed or support. In these schemes of gas generation, the monopropellant, which decomposes exothermally, reacts with the initiator to start decomposition, generate heat, and heat the support which, when heated, thermally sustains the decomposition.

SUMMARY OF THE INVENTION

This invention involves the use of a suitable absorbing material as a chemi-thermal bed for the decomposition of exothermally decomposing monopropellants. In accordance with this invention, I have discovered that adsorbents such as activated charcoal of suitable size or mesh, activated alumina, and silica gel will adsorb various compounds which are gases at 25° C, such as dinitrogen tetroxide and chlorine, and which react vigorously with certain monopropellants such as hydrazine and hydraxine-type fuels (e.g., 1,1-dimethylhydrazine and monomethylhydrazine). These adsorbents will also adsorb vapors of volatile liquids such as phosphorous oxychloride and free liquids such as liquid dinitrogen tetroxide.

DESCRIPTION OF THE PREFERRED EMBODIMENTS

When placed in contact with a reactive, exothermally decomposing monopropellant, the active adsorbed material (adsorbate) on the adsorbent reacts with the monopropellant to generate heat which raises the temperature of the adsorbent or carrier (e.g., activated charcoal) sufficiently to maintain the exothermal decomposition of the monopropellant even after the adsorbate has been consumed. Thus, the adsorbent serves as a thermal bed to maintain monopropellant decomposition for gas generation, and the adsorbate acts as an initiator by reacting with the monopropellant to start decomposition and to heat the bed. In other words, the adsorbate acts as an initiator and the adsorbent acts as a carrier.

The following specific example of this invention is merely intended to be illustrative thereof, and no limitations on the scope of this invention are to be inferred therefrom.

Activated cocoanut charcoal (6–16 mesh) was exposed to a dinitrogen tetroxide atmosphere. It adsorbed the dinitrogen tetroxide to a degree such that the final weight of material represented a mixture of about 30 percent dinitrogen tetroxide and about 70 percent charcoal. Alternatively, the material may be prepared by heating the activated charcoal to 300° C and vacuum pumping. Without exposure to the air, the charcoal is cooled to ambient temperature and then exposed to a dinitrogen tetroxide atmosphere. Again, the total weight of material represents a loading of 30 or more percent dinitrogen tetroxide. When, 1,1-dimethylhydrazine was brought into contact with this dinitrogen tetroxide-charcoal material, a rapid and vigorous reaction occurred and the 1,1-dimethylhydrazine was ignited. After all flame had disappeared and the dinitrogen tetroxide had been consumed, the charcoal was still hot enough to ignite subsequent additions of 1,1-dimethylhydrazine.

Thus, the monopropellant must be an exothermally decomposing type so that when decomposed, it liberates heat which raises the temperature of the adsorbent or bed such that the exothermal decomposition of the monopropellant is maintained thermally.

We claim:

1. The method of making a thermal bed for a gas generator comprising: selecting an adsorbent from the group consisting of activated charcoal, silicia gel and activated alumina, and exposing said selected adsorbent to an atmosphere of a compound selected from the group consisting essentially of dinitrogen tetroxide, chlorine and phosphorous oxychloride, said selected absorbent being exposed to said atmosphere of said selected compound until said thermal bed that is composed of said selected adsorbent and said selected compound contains up to 30 weight percent of said selected compound, said selected compound, when exposed in said atmosphere to said adsorbent, being adsorbed on the surface of said selected adsorbent.

2. The method of making a thermal bed as set forth in claim 1, wherein said adsorbent is heated, vacuum pumped in an inert atmosphere, and cooled before being exposed to said atmosphere of said selected compound.

3. The method of making a thermal bed as set forth in claim 1, wherein said adsorbent is activated charcoal and said selected compound is dinitrogen tetroxide.

4. The method of making a thermal bed as set forth in claim 3, wherein said activated charcoal is 6–16 mesh cocoanut charcoal.

5. The method of making a thermal bed as set forth in claim 4, wherein said cocoanut charcoal is heated, vacuum pumped in an inert atmosphere, and cooled before being exposed to the atmosphere of dinitrogen tetroxide, and wherein said dinitrogen tetroxide amounts to about 30 weight percent of said thermal bed.

* * * * *